United States Patent [19]
Hartman

[11] 3,799,501
[45] Mar. 26, 1974

[54] ELASTOMERS IN SHEAR FORCE TRANSFER SYSTEMS

[76] Inventor: Thomas A. Hartman, 700 Capac Ct., St. Louis, Mo. 63125

[22] Filed: Dec. 27, 1971

[21] Appl. No.: 212,604

Related U.S. Application Data

[63] Continuation of Ser. No. 32,838, April 29, 1970, abandoned.

[52] U.S. Cl.............. 251/306, 277/209, 49/489
[51] Int. Cl. ........ F16k 1/22, F16k 3/00, F16k 5/06
[58] Field of Search .......... 215/40; 277/237, 207 A, 277/208, 209, 1; 251/173, 172, 314, 306; 220/46 R; 49/489

[56] References Cited
UNITED STATES PATENTS

| 3,166,291 | 1/1965 | Grove | 251/172 |
| 3,215,157 | 11/1965 | Anderson et al. | 137/246 |
| 3,250,510 | 5/1966 | Williams | 251/173 |
| 3,612,483 | 10/1971 | Pool | 277/75 |

FOREIGN PATENTS OR APPLICATIONS

| 949,442 | 12/1964 | Great Britain | 251/306 |
| 887,480 | 1/1962 | Great Britain | 215/40 |

Primary Examiner—Samuel B. Rothberg
Attorney, Agent, or Firm—Rogers, Ezell & Eilers

[57] ABSTRACT

This is an elastomer seal having spring and centering support characteristics and employing the shear properties of elastomers. The present structure in an important adaptation is an improved seal for valves, as butterfly, ball, gate, and others. Also involved is the use of elastomers in shear in force transfer systems to seal, position, retain, or actuate and the novel methods thus involved.

5 Claims, 20 Drawing Figures

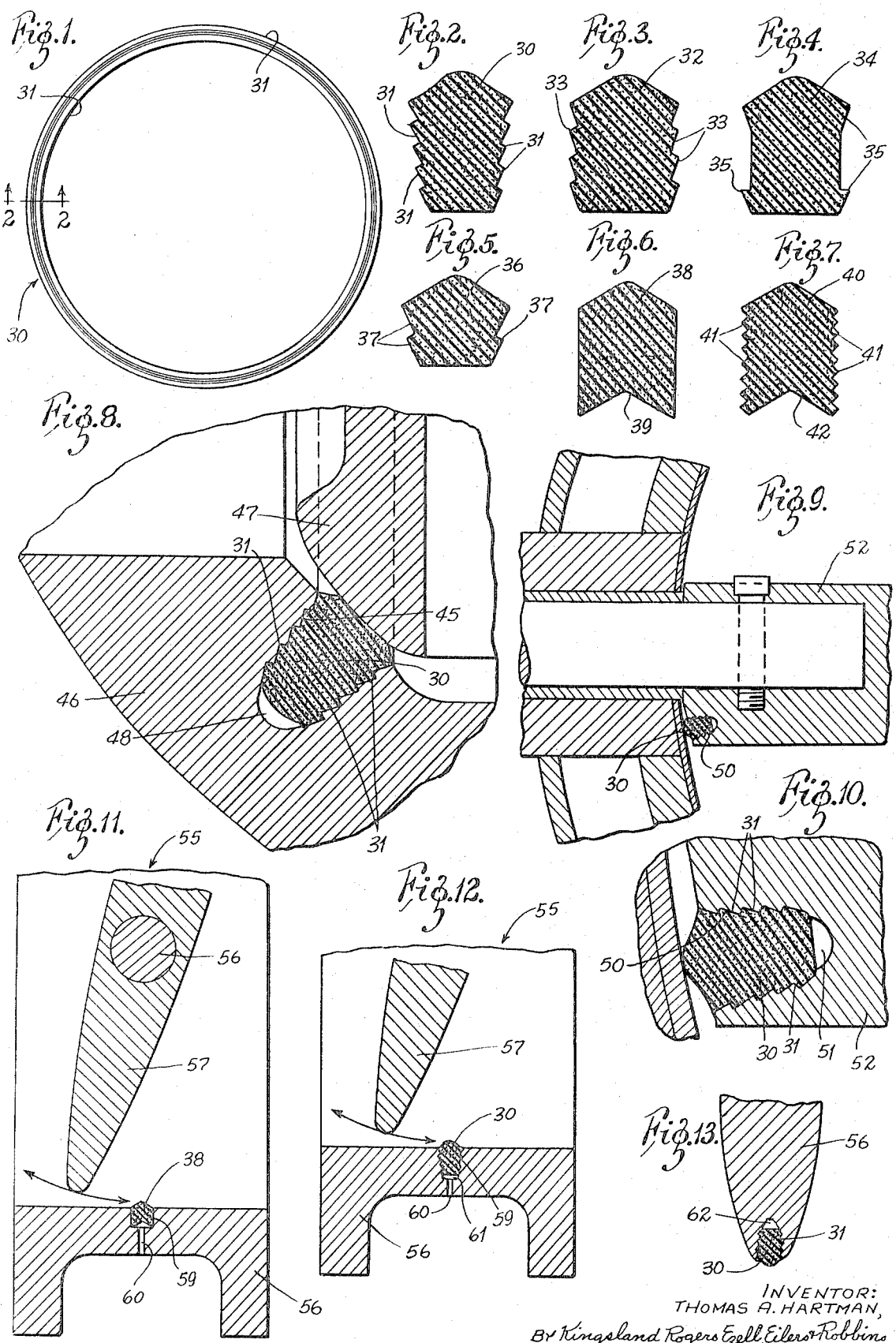

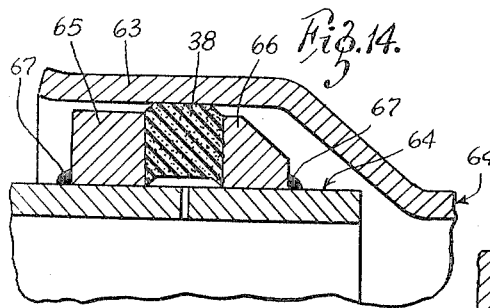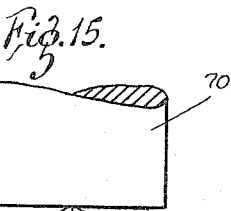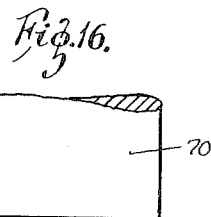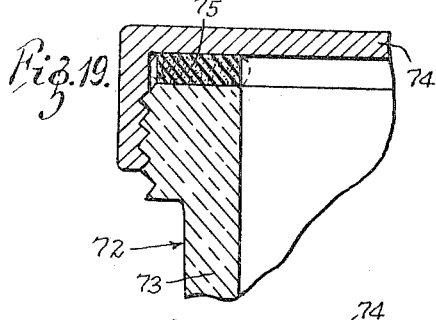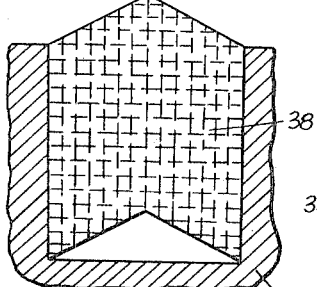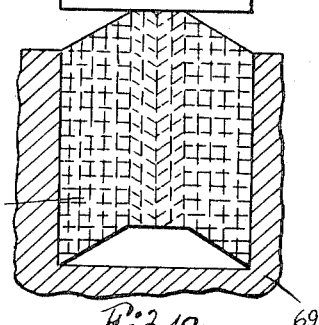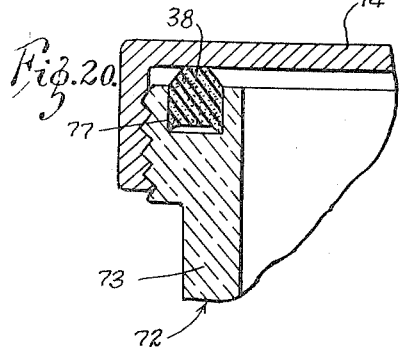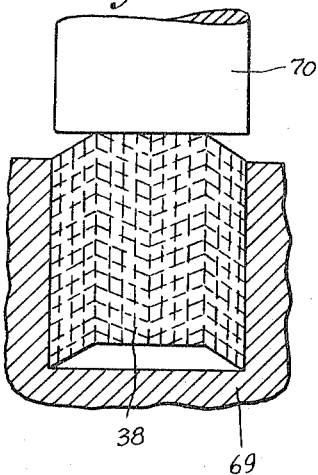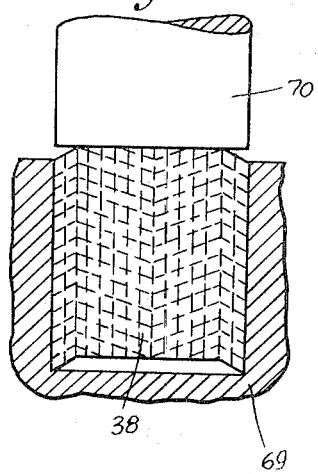

3,799,501

ELASTOMERS IN SHEAR FORCE TRANSFER SYSTEMS

This is a continuation, of application Ser. No. 32,838 filed Apr. 29, 1970 and now abandoned.

BACKGROUND OF THE INVENTION

1. Field Of The Invention

The present invention is generally directed to the art of employing elastomers in sealing, force transfer and positioning, and more particularly concerns a novel seal for valves, pipes and fittings, employing the equal distribution throughout the elastomer structure of total stress applied thereto, and other applications. Novel methods of effecting sealing, and the like, and of installing certain shapes of seal are included.

2. Description Of The Prior Art

There are many prior art sealing structures and methods, numerous patents having been granted on various forms of O-rings, and the like, per se, and on adaptations thereof. However, the applicant has no knowledge of any sealing, force transfer or positioning structures or methods of the nature of the disclosed structure and method. There has long existed a need for the present structure and method.

SUMMARY OF THE INVENTION

The present invention broadly comprises the use of elastomers in shear in sealing, force transfer, and positioning, and the retention of such elastomers being used in shear. As a seal for valves, the cross section of the present novel sealing ring is formed for mechanical and frictional retention by complementary grooves in an annular retention channel or for bonded retention to the walls of an annular channel. Space is provided at the bottom of the channel for physical movement of the central part of the elastomer ring thereinto in the sealing action, or in the elastomer bottom. Apertures may be provided for pressure purposes, fluid drainage, and the like. Novel methods of effecting sealing, and the like, and of installing certain cross sections of seal are included.

Objects of the present invention are to provide novel structures and methods of using elastomers in shear in sealing, force transfer, and positioning which provide an improved seal, which give a greater sealing tolerance while retaining the improved sealing characteristic, which provide opening and closing performances requiring less force than standard structures and methods, which provide improved stress distribution in the seal, which provide increased protection against overcompression, which are durable and long lasting in operative performance, and which otherwise fulfill the objects and advantages sought.

BRIEF DESCRIPTION OF THE DRAWINGS

FIG. 1 is a plan view of an elastomer sealing ring;

FIGS. 2-7 are enlarged cross-sectional views on substantially the line 2—2 of FIG. 1, illustrating various forms the ring may take;

FIG. 8 is a fragmentary view of a ball valve incorporating the present elastomer sealing ring;

FIG. 9 is a fragmentary view of a butterfly valve incorporating the present elastomer sealing ring;

FIG. 10 is a fragmentary enlarged view of the elastomer sealing ring and cooperating parts;

FIGS. 11 and 12 are diagrammatic views of a mounted elastomer sealing ring and a movable valve, showing two ring cross sections;

FIG. 13 is a diagrammatic view illustrating an elastomer sealing ring mounted in a movable valve;

FIG. 14 is a fragmentary view illustrating an elastomer sealing ring sealing the joint between the ball and regular ends of pipe;

FIGS. 15-18 are diagrammatic views illustrating the elastomer in shear principle involved in the present invention;

FIG. 19 is a fragmentary cross-sectional view of a conventional Mason jar, showing a standard sealing ring; and FIG. 20 is a fragmentary cross-sectional view of a Mason jar modified to incorporate the present novel elastomer seal.

DESCRIPTION OF PREFERRED EMBODIMENTS

Preliminarily, it is to be understood that the elastomers employed will be used within their elastic limits, and it is assumed that where the elastomer is in contact with the material which contains it, there is basically little or no movement of the elastomer at the containing material-elastomer interface or interfaces. For purposes of the present invention, by elastomer is meant any polymer whose elastic deformation under conditions of shear satisfies the sealing and the like, requirements. Several urethanes, natural and synthetic rubber, and the like, have been successfully employed.

Referring to the drawings more particularly by reference numerals, an elastomer sealing ring 30 is shown having converging sides with annular fins 31, as is clearly illustrated in FIG. 2. Also shown are an elastomer sealing ring 32 with parallel sides having annular fins 33 (FIG. 3), an elastomer sealing ring 34 with parallel sides having spaced annular fins 35 (FIG. 4), an elastomer sealing ring 36 having converging sides with annular fins 37 (FIG. 5), an elastomer sealing ring 38 of chevron cross section having substantially smooth parallel sides and a substantially V-shaped annular groove 39 in the bottom (FIG. 6), and an elastomer sealing ring 40 of chevron cross section having parallel sides with annular fins 41 and a substantially V-shaped annular groove 42 in the bottom (FIG. 7).

In FIG. 8, the elastomer sealing ring 30 is shown mounted in an annular channel 45 of complementary side cross section and including an annular bottom space 48 formed in a portion 46 of the stationary housing of a conventional ball valve. The ring 30 is illustrated deformed under a force exerted by a movable ball member 47 in closed position. The central portion of the ring 30 has moved bodily away from the ball member 47 into the annular space 48 at the bottom of the channel 45 which is an essential part of the invention. Thus, the ring 30 is not in simple compression, since elastomers are substantially non-compressible, but is under shearing stress, inasmuch as there is substantially no movement between the elastomer-channel walls interfaces. When the ball member 47 is moved to another position, the ring 30 returns to its cross section of FIG. 2, another characteristic of elastomers. The ring 30 is installed by hammering it into the channel 45, which can be readily accomplished, since the bottom of the ring 30 will move under impact momentarily into the annular space 48 of the channel 45 permitting the fins 31 to interlock in the channel 45. Some cross sections may require retaining rings, and the like.

Similarly, in FIGS. 9 and 10, the elastomer sealing ring 30 is shown mounted in an annular channel 50 of complementary side cross section nd including an annular bottom space 51 formed in a valve member 52 of a conventional butterfly valve. The butterfly valve member 52 is in open position, hence, the ring 30 is in rest configuration, but will deform as in FIG. 8 upon closing of the member 52.

In FIG. 11 is diagrammatically shown a butterfly valve 55 including a stationary member 56, a movable member 57 pivotally mounted on the stationary member 56 through trunnions 58, and a ring 38 adhesively bonded to the opposed walls of a channel 59 in the stationary member 56. Vents 60 are provided for pressure or water removal purposes. The ring 38 will deform as the ring 30 under a force applied by the pivotally mounted member 57 in sealing engagement therewith. Since the ring 38 includes a bottom space, none is provided in the channel 59, but for excessive elastomer movement a space may be provided. FIG. 12 is similar to FIG. 11, but employs ring 30 instead of ring 38, and includes an annular space 61. FIG. 13 shows the ring 30 in the periphery of the movable member 56 and an annular space 62. Other configurations may be employed.

In FIG. 14 an elastomer sealing ring 38 is shown sealing the joint between the bell end 63 of one pipe 64 and the small end of a second pipe 64. Spaced metal rings 65 and 66 secured to the small end of the second pipe 64, as by welding 67, confine the ring 38. As the bell end 63 is slipped over the ring 38, the latter is depressed into the configuration shown.

FIGS. 15–18 diagrammatically illustrate the shear forces in a segment of the chevron elastomer sealing ring 38 in a continuous retainer 69 as a ram 70 moves from the position of FIG. 15 to the position of FIG. 18. When the ram 70 retreats to the position of FIG. 15, the ring 38 will return to its rest configuration thereof. It will be understood that the segment of ring 38 is confined and anchored to the walls of the retainer 69.

In FIG. 19 is illustrated a segment of a conventional Mason jar 72 including a threaded jar body 73, an internally threaded cap 74 and a flat compression sealing ring 75 shown slightly bulged at the sides as indicated by the dotted lines under compression from sealing pressure from the cap 74. In FIG. 20 the threaded jar body 73 includes an annular channel 77 in which is disposed an elastomer sealing ring 38 deformed under sealing force from the cap 74.

The Mason jars of FIGS. 19 and 20 illustrate in simple manner the advantages of the present novel structure. Complete sealing is obtained with the ring 38 with a much greater tolerance than with the ring 75 because ther is little compression in standard rings 75, hence, the user must be sure he firmly tightens the cap 74. With the ring 38, there is tight sealing beginning with the configuration of FIG. 16. The cap 74 of modified jar 72 can be sealingly engaged and released with much less applied force than the cap 74 of the conventional jar 72. There is a better seal and a better stress distribution in the sealing ring 38 than in ring 75. Ring 38 affords a better protection against over-compression than does ring 75, and will last longer, giving perfect sealing.

It is manifest that there have been provided novel structure and methods fulfilling the objects and advantages sought. It is clear that the basic invention here disclosed is capable of wide adaptation, finding numerous uses and taking many forms.

It is to be understood that the foregoing description and the accompanying drawings have been given by way of illustration and example. It is also to be understood that changes in form of the several parts, substitution of equivalent elements or steps, and rearrangement of parts or steps, which will be readily apparent to one skilled in the art, are contemplated as within the scope of the present invention, which is limited only by the claims which follow.

What is claimed is:

1. A valve construction comprising a first valve member having a passage therethrough, a second valve member, means for mounting said second valve member for movement relative to said first valve member between an open position with the passage open and a closed position with the passage closed, one of said valve members having a channel therein, said channel being open at the top and having a bottom and opposite sides, at least one side having preformed multiple side serrations, an elastomer sealing member disposed in said channel and having a side wall adjacent the serrated side of the channel with preformed complementary multiple side serrations and an opposite side wall adjacent the other wall of the channel, the fit between the walls of the sealing member including its multiple side serrations and the walls of the channel and its multiple side serrations being congruent providing substantially immovable engagement of at least the serrated side of the sealing member with the serrated side of the channel in the direction generally parallel to a force tending to urge the sealing member downwardly into the channel, and the other of said first or second valve members having a contacting surface, the sealing member having a top surface between its sides located at the opening of the channel adapted to sealingly engage with said contacting surface of said other valve member with said second valve member in its closed position, the elastomer sealing member extending only part way into the channel to define a cavity within the channel at the bottom of the sealing member such that the sealing member is sufficiently unrestrained at its bottom side to permit movement in shear of substantially the entire portion of the elastomer sealing member other than those portions engaging the serrations of the channel, whereby the retained energy of the elastomer placed in shear effects a seal between the elastomer sealing member and the contacting surface.

2. The combination of claim 1, wherein the sealing member and channel each have multiple side serrations on opposite sides.

3. The combination of claim 1 wherein at least the side of the sealing member and the channel having complementary side serrations are tapered inwardly toward the side opposite the applied force, the tapered sides acting in conjunction with the complementary side serrations to effectively lock said side of the sealing member into said immovable engagement with said side of the channel.

4. The combination of claim 2 wherein the sides of the sealing member and channel are tapered inwardly toward the side opposite the applied force, the tapered sides acting in conjunction with the complementary side serrations to effectively lock the sides of the sealing member into said immovable engagement with the sides of the channel.

5. The combination of claim 1 in which the top surface of said elastomer sealing member extends above said retention channel for ready sealing engagement.

* * * * *